May 15, 1962 — C. KRANC ET AL — 3,034,174
CANDLE MOLDING MACHINE
Filed April 29, 1960 — 4 Sheets-Sheet 3

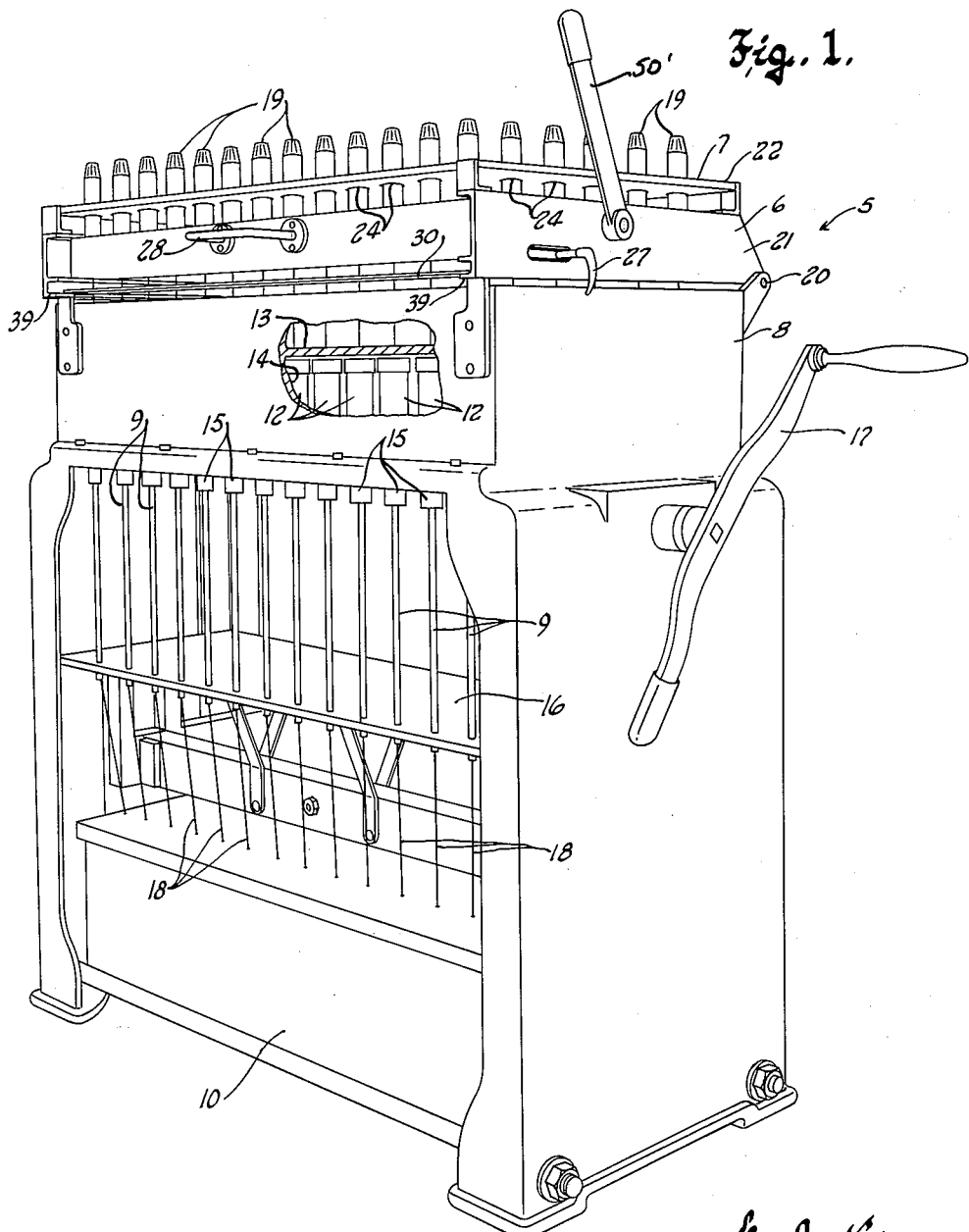

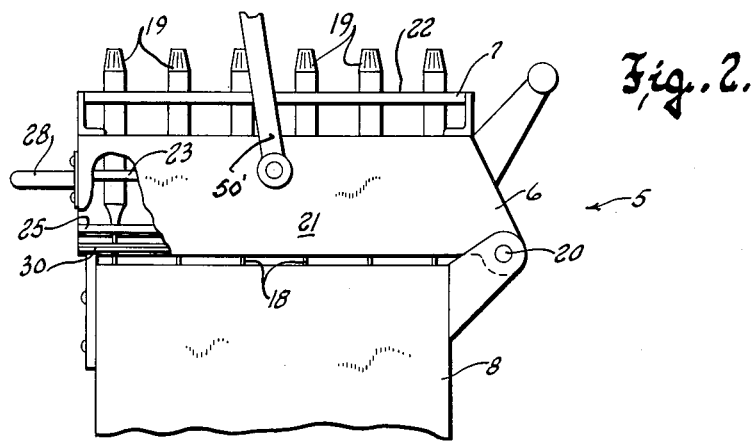
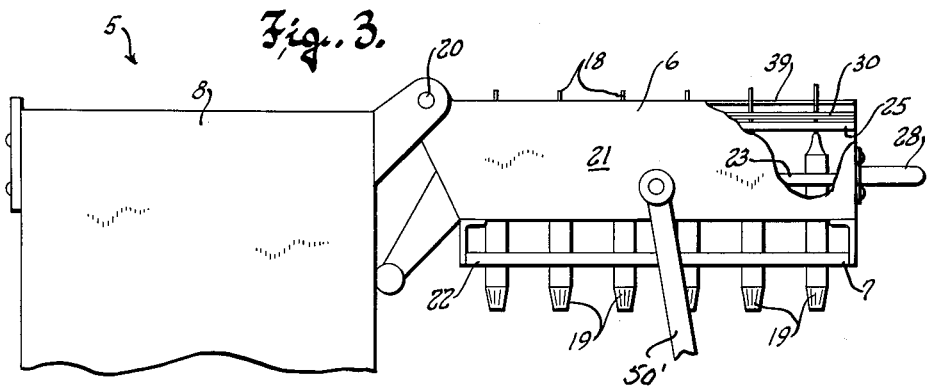
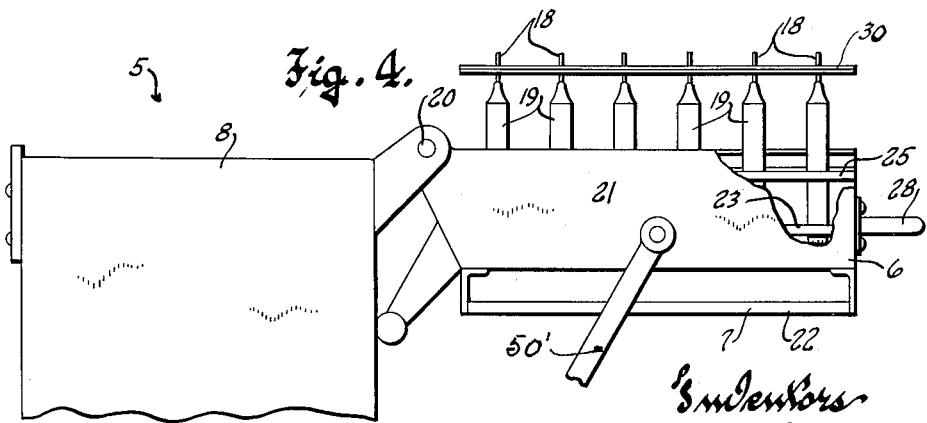

Inventors
Casimir Kranc
Arvid Carrick

May 15, 1962 C. KRANC ET AL 3,034,174
CANDLE MOLDING MACHINE
Filed April 29, 1960 4 Sheets-Sheet 4
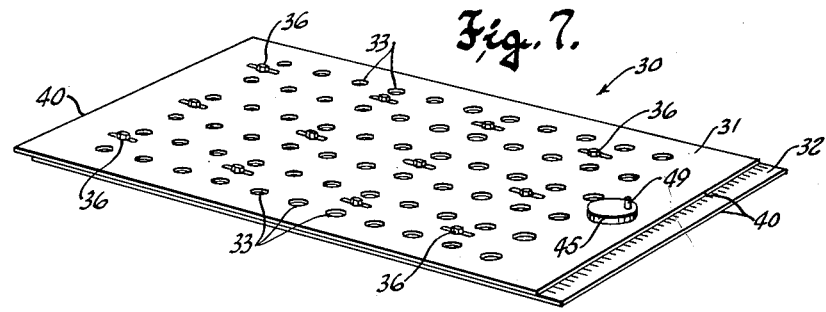
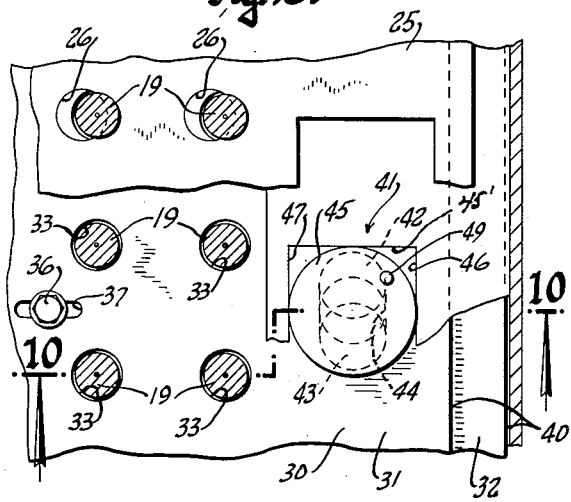
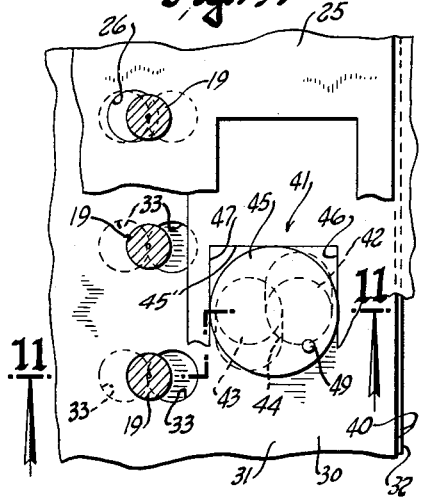
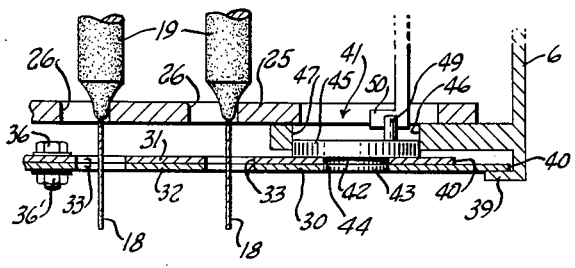
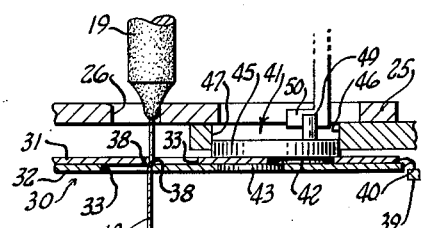
Inventors
Casimir Kranc
Arvid Carrick

United States Patent Office 3,034,174
Patented May 15, 1962

3,034,174
CANDLE MOLDING MACHINE
Casimir Kranc and Arvid Carrick, Oshkosh, Wis., assignors to Victrylite Candle Company, Oshkosh, Wis., a corporation of Wisconsin
Filed Apr. 29, 1960, Ser. No. 25,774
4 Claims. (Cl. 18—27)

This invention relates generally to apparatus for making molded candles, and refers more particularly to improvements in such apparatus that provide a carrier by which the wicks of all of the finished candles in a batch made in a candle molding machine can be securely but readily releasably gripped to enable simultaneous withdrawal from the machine, in a single operation, of all of the candles in the batch, and by which carrier the entire batch of candles can be transported to and dipped in a coating bath without the need for handling the several candles individually.

The conventional matchine for manufacture of molded candles comprises a group of upright, laterally spaced apart tubular molds which open at their upper ends to a filling tray onto which molten wax or other candle body material can be poured, and from which such material runs down into the molds. While the candles are being poured, the molds are closed at their lower ends by the plug-like tops of axially movable tubular ejectors. When the newly cast candles have hardened, the ejectors are moved upwardly in the molds to propel the candles into a finished candle rack at the top of the machine, located over the molds, in which the hardening candles are held while a new batch of candles is being cast.

The wick of each candle in the rack comprises part of a continuous strand of wick material that extends upwardly from a bobbin or the like located beneath the ejectors, through the bores in the ejectors and through the molds. During the pouring of the next batch of candles the rack holds the just-molded candles in such positions that the strands of wick material extending down from them are coaxial with the molds beneath them, to thus insure that the new candles will have wicks that are centered along their entire lengths.

When the new batch of candles has substantially hardened, the wick material is cut by means of a sharp knife passed along the upper surface of the filling tray, and thereafter the finished candle rack is bodily swung through an angle which disposes it alongside the molds, with its underside exposed so that the finished candles can be lifted out of it. When all the candles have been removed from the rack, it is swung back to its normal position over the molds, ready to receive the new batch of candles and repeat the cycle.

White candles are usually packaged immediately upon their withdrawal from the rack of the molding machine, but if finished candles are to be of some other color than white they must be dipped in a colored wax bath before they are ready for packaging. The reason for this dipping of colored candles is that it is impractical to use different colored waxes in a molding machine since it would be necessary to clean the machine each time wax of a different color was used therein, to avoid muddying the colors. Cleaning the molding machine is such a difficult and time consuming task that it is quicker, easier and cheaper to use only white wax in the molding machine, and to impart the desired colors to the candles by coating their surfaces with colored wax in a special dipping operation.

Heretofore it has been conventional to manually remove candles one by one from the rack of the molding machine, and then either dip them one at a time in the colored wax bath or else secure them one by one to a dipping frame or dipping board, from which they were pendulously suspended by their wicks so that a large group of them could be simultaneously dipped. Either of these procedures obviously required individual handling of each and every candle in order to accomplish dipping thereof.

By contrast, it is an object of this invention to provide means cooperable with a conventional candle molding machine whereby all of the hardened candles in a batch held in the finished candle rack of the machine can be simultaneously withdrawn from the rack in a single quick operation, transported as a group to a dipping tank, and there dipped as a group into the coating material, without the necessity for any handling of single candles individually.

More specifically, it is an object of this invention to provide a dipping carrier cooperable with a candle molding machine of the character described, by which the wicks of all of the candles in a batch molded by the machine are readily releasably but securely gripped to enable simultaneous withdrawal from the machine of all of the candles constituting the batch, and by which dipping carrier the candles are held pendently suspended by their wicks so that they can thus be readily transported to and dipped in a dipping bath.

Another object of this invention is to provide a candle molding machine of the character described, with means adapted to readily removably receive and hold a multiple candle dipping carrier at the underside of the finished candle rack, and also to provide means for "opening" and "closing" a carrier so placed in the machine. With the candle molding machine thus equipped, a candle dipping carrier may be inserted into the machine, immediately prior to ejection of the partially hardened candles out of the molds; "opened" to allow the candles to be ejected from the molds and pushed up through the dipping carrier into the finished candle rack, and then "closed" to grip the wicks of the partially hardened candles in the rack. Then, after the rack has been inverted or rolled over to its unloading position, the carrier may be lifted from the machine to simultaneously withdraw all of the candles gripped thereby from the rack and enable them to be dipped as a group. If the dipping carrier is large enough, all of the candles in the rack may be handled at one time by means of it, although the advantages of this invention will obviously be realized if two or more dipping carriers, placed side-by-side, are employed to handle all of the candles molded at one time.

It is also a specific object of this invention to provide a candle carrier of the character described which is cooperable with existing candle molding machines to permit the attainment of the objectives set forth above, without the necessity for any but very minor modifications of such existing machines and without interfering with their normal operation.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

FIGURE 1 is a front perspective view of a candle molding machine incorporating the improvements of this invention, portions of the machine being shown broken away;

FIGURE 2 is a side elevational view of the upper portion of the machine shown in FIGURE 1, with the finished candle rack shown in its normal position, and with portions of the rack shown broken away;

FIGURE 3 is a view similar to FIGURE 2 but showing the finished candle rack in its unloading position;

FIGURE 4 is a view similar to FIGURE 3 but showing candles in the rack partially removed therefrom by means of the carrier of this invention;

FIGURE 7 is a top perspective view of the candle carrier of this invention;

FIGURE 8 is a fragmentary plan view of the candle carrier and its supporting means in the finished candle rack, with the carrier shown in its inoperative position;

FIGURE 9 is a view similar to FIGURE 8, but showing the carrier in its operative position.

FIGURE 10 is a sectional view taken on the plane of the line 10—10 in FIGURE 8; and FIGURE 11 is a sectional view taken on the plane of the line 11—11 in FIGURE 9.

Figure 5:
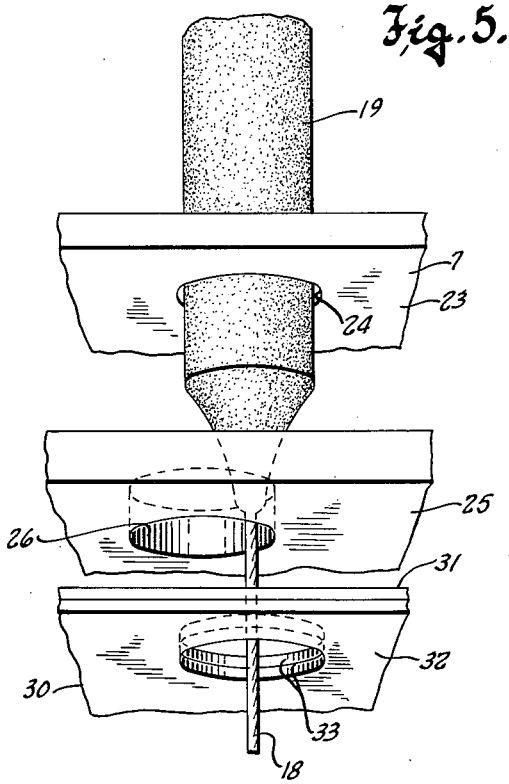
FIGURE 5 is a fragmentary perspective view of a portion of the finished candle rack and the candle carrier of this invention, the latter being shown in its inoperative or open position.

Referring now more particularly to the accompanying drawings, the numeral 5 designates generally a candle molding machine that comprises in general a frame 6 that supports a finished candle rack 7 at the top of the machine, a mold section 8 beneath the finished candle rack, a plurality of vertically movable ejectors 9 beneath the mold section, and a chamber 10 at the bottom of the machine in which are housed bobbins or the like for wick material.

The mold section 8 comprises a plurality of upright tubular candle molds 12, supported at their upper ends by a filling tray 13 fixed to the machine frame 6 and to which the molds open. Molten wax or other candle body material is poured onto the tray 13 to be distributed thereby to the several molds, and from the tray the wax runs down into the molds and fills them. The bottoms of the molds are closed by plug-like head portions 15 on the ejectors 9, so that the shape of the ejector head portion 15 defines the shape of the top portion of the finished candle.

A water jacket 14 surrounds all of the molds and is adapted to receive hot water or steam for heating the molds when a batch of candles is being poured and cold water for chilling the molds to effect hardening of the candles.

There is, of course, an ejector 9 for each mold, axially movable therein, and the several ejectors are carried by and project upward from a plate-like horizontal cross head 16 which is mounted in the machine frame 6 for flatwise up and down motion beneath the molds. A hand crank 17, accessible at the side of the machine is connected with the cross head 16 by known means to provide for such raising and lowering of the cross head. The ejectors are coaxially bored along their entire lengths so that a strand of wick material 18 can extend upwardly through each ejector, and through the mold with which it is associated, from a bobbin, (not shown), or the like in the chamber 10 beneath the cross head 16.

When the ejectors are moved axially upwardly in their respective molds by elevation of the cross head 16, they propel the partially hardened candles 19 upwardly out of the molds and into the finished candle rack 7 at the top of the machine, in which they are held during the molding of the next batch of candles. The strands of wick material that extend through the candles 19 are uncut at the time they are transferred to the finished candle rack, and the rack holds each hardening candle exactly coaxially with the mold in which it was made. Hence the strand of wick material extending down from each hardening candle through the bore of the ejector therebeneath is exactly coaxial with the mold in which the candle was formed, insuring that the next candle cast in the same mold will have its wick centered along its entire length.

The finished candle rack comprises a frame 21 which is connected to the machine frame 6 by a hinge 20 at the rear thereof, for bodily swinging motion about a horizontal axis, from a normal position, disposed over the mold section (as shown in FIGURES 1 and 2) to an unloading position alongside the mold section (as shown in FIGURE 3). The frame 21 of the finished candle rack supports a pair of horizontal rack plates 22 and 23 in parallel vertically spaced apart relationship. Both rack plates have holes 24 which are coaxial with the molds in the mold section of the machine when the rack is in its normal position and which are just large enough in diameter to freely receive the just-molded candles as they are propelled axially upwardly from the molds by the ejectors, so that the two rack plates cooperate to hold the candles against tilting out of upright positions.

To prevent candles in the rack from dropping back down into the molds as the ejectors are lowered, a horizontal holding plate 25 is mounted on the frame 21 of the finished candle rack, directly beneath the lower rack plate 23, for edgewise sliding motion between operative and inoperative poistions. The holding plate has holes 26 that correspond in diameter and spacing to the holes 24 in the rack plates 22 and 23, and which are coaxial with the molds and the holes 24 in the rack plates when the holding plate is in its inoperative position of edgewise sliding motion, so that the molded candles may pass freely through the holding plate as they are ejected from the molds.

Figure 6:
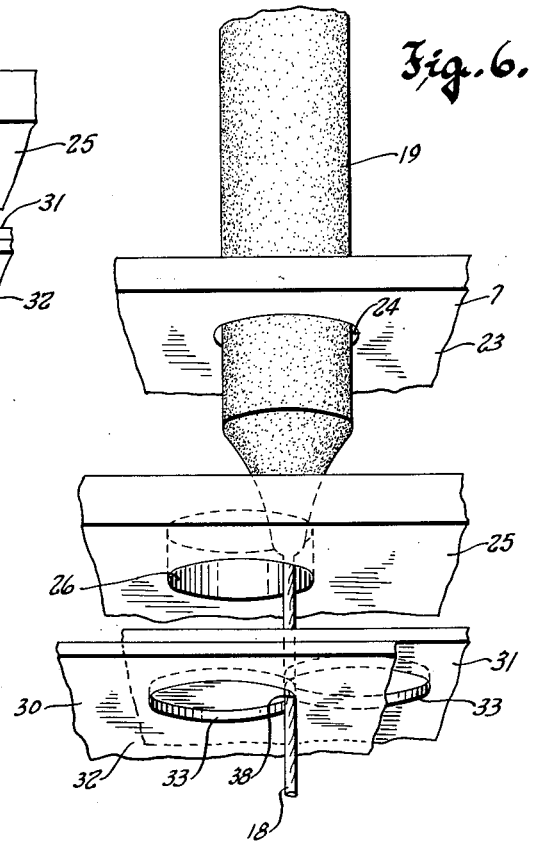
FIGURE 6 is a view similar to FIGURE 5, but showing the candle carrier in its operative, closed, wick gripping position.

When the ejectors reach their uppermost position of vertical travel, the holding plate is slid edgewise, by means of a hand lever 27 accessible at one side of the machine, to its operative position in which the holes 26 are substantially eccentric to the holes 24 in the rack plates 22 and 23, and (as illustrated in FIGURES 5 and 6) the candles in the rack then rest on the marginal edge portions at one side of the holes 26 in the holding plate as the ejectors move back down. The connection between the hand lever 27 and the holding plate is well known and therefore is not shown.

As is well known to those skilled in the art, when a new batch of candles has been molded and has substantially hardened, a knife (not shown) is moved along the upper surface of the pouring tray 13 to cut through the strands of wick material that extend downwardly from the hardened candles 19 in the rack and through the new candles in the molds. When the hardened candles in the rack have thus been detached from the candles still in the molds by the severing of the wick material, the finished candle rack can be swung bodily about the hinges 20 at the back of the machine, to its candle unloading position alongside the molds, at which its underside is exposed. A handle 28, fixed to the front of the rack frame 21, facilitates such bodily swinging of the rack. The holding plate 25 is then slid edgewise back to its inoperative position by means of the hand lever 27, permitting the hardened candles in the rack to be withdrawn from it.

The apparatus described up to this point is conventional and well known. Heretofore removal of the candles from the finished candle rack has necessitated individual handling of each candle, but the present invention contemplates the provision of a multiple candle carrier or dipping board 30 which securely but releasably grips the wicks of the finished candles when the rack 7 is in its normal position overlying the molds, and which can be raised off of the rack when the rack is swung over to its unloading position. As the carrier is thus lifted, it carries upwardly with it all of the candles gripped thereby; with the candles pendently suspended from the carrier by their wicks, ready to be presented to the dipping bath. While the multiple candle carrier 30 may be large enough to handle at one time the entire batch of candles molded in the machine it may be desirable in some cases to use two or more smaller carriers side-by-side, separately removable from the machine.

The candle carrier 30 comprises, in general, a pair of flat plates 31 and 32, each provided with a plurality of holes 33 that are large enough in diameter to permit candles to pass axially therethrough, and which are spaced apart by distances corresponding to the spacing of the holes in the rack plates 22 and 23. The two carrier plates 31 and 32 are secured together in flatwise superimposed relationship for edgewise sliding motion relative to one another between an open or inoperative position (illustrated in FIGURE 5) in which the holes 33 in the two plates are coaxial and in register with one another, and a closed or gripping position (illustrated in FIGURE 6) in which the holes in the two plates are substantially eccentric and opposing edge portions 38 of the holes in the two plates are adapted to cooperate in gripping the wicks of candles. Preferably the connection between the plates comprises screws 36 extending through the two plates in lengthwise extending slots 37 and secured by nuts 36' which are tightened just enough to cause the plates to slide with considerable friction and thus resist displacement out of any position of edgewise adjustment in which they are set.

Fixed to opposite sides of the frame 21 of the finished candle rack are inwardly projecting flanges 39 which provide ledges that face upwardly when the rack is in its normal position and which are spaced a short distance below the plane of the holding plate 25. When the plates 31 and 32 of the carrier 30 are in their open or inoperative positions, their adjacent end edges 40 are stepped or endwise spaced apart, as best seen in FIGURES 7 and 10, and the overall length of the carrier is such that its opposite end portions can rest on the flanges 39. Hence, when the carrier is in its open position it can be inserted into the rack frame from the front thereof by sliding it edgewise onto the flanges 39. But when the plates comprising the carrier are shifted edgewise to their wick gripping or operative positions, their end edges 40 are substantially vertically aligned with one another (as best seen in FIGURE 11), and the overall length of the carrier is reduced to slightly less than the distance between the inner edges of the flanges 39, so that the carrier can be moved flatwise away from the flanges when the finished candle rack is swung to its unloading position.

To actuate the carrier in such edgewise shifting of the carrier plates it is provided with a cam actuator designated generally by 41 and comprising an actuator disc 45 and upper and lower cam discs 42 and 43, secured to one another in flatwise superimposed relationship for rotation in unison. The actuator disc, which may be substantially larger in diameter than the cam discs 42 and 43, overlies the upper carrier plate 31 while each of the cam discs is received in a closely fitting transverse slot 44 in one of the carrier plates and has a thickness substantially equal to that of the carrier plate in which it is engaged.

The upper and lower cam discs 42 and 43 are eccentrically disposed at opposite sides of the axis of the actuator disc 45, and therefore when the cam disc assembly is rotated through a quarter of a turn the two carrier plates are shifted edgewise in opposite directions, from one of their defined positions to the other. To insure that both end portions of the carrier are disengaged from the flanges 39 when the carrier plates are moved to their operative positions, the actuator disc 45 is confined between a pair of parallel fore-and-aft extending guide members 46 and 47 that are fixed on the rack frame and cooperate to define a forwardly opening slot having a width equal to the diameter of the actuator disc. The guide members thus constrain the actuator on its axis, and thereby compel the cam discs to shift both carrier plates relative to the frame 21.

The guide member 46 may comprise a flange that projects inwardly from one side of the rack frame 21 above the flange 39 at that side of the frame, and upon which the holding plate 25 rests; while the member 47 may comprise a bar or the like suitably fixed to the rack frame in parallel spaced relation to the inner edge of the flange 46. The actuator disc slides readily into the slot between the members 46 and 47 as the carrier is slid onto the flanges 39 from the front of the machine.

The carrier actuator 41 is rotated to effect carrier plate shifting by means of a pin 49 eccentrically fixed to and projecting upwardly from the actuator disc, and a cooperating pusher 50 which is movable back and forth by a suitable manual actuator having a handle 50'. The pin 49 is so located on the actuator disc that upon insertion of the carrier 30 into the machine with its plates 31 and 32 in their open positions, the pin will lie directly in front of the pusher 50. Hence, by moving the pusher towards the front of the machine, it engages the pin and rotates the actuator and cam discs to slide the carrier plates from their open to their wick gripping positions.

The carrier, with its plates in their open positions, is slid into the rack frame 21 from the front thereof just before a batch of candles is propelled upwardly from the molds into the finished candle rack, taking care, of course, that the end portions of the carrier are properly seated on the flanges 39 and that the actuator disc 45 is properly engaged in the slot between the opposing faces of guide members 46 and 47. The engagement of the actuator disc 45 in the slot between the guide members 46 and 47 and against the bottom 45' of the slot, properly locates the carrier with respect to the molds, and thus centers the coaxially disposed holes 33 in its plates 31 and 32 with the molds to permit candles to pass freely therethrough from the molds to the rack (see FIGURE 5).

When a new batch of candles has been poured and has hardened, the pusher 50 is actuated to slide the carrier plates edgewise to their operative positions, in which they grip the wicks. The wick strands may be cut either directly before or just after the carrier plates are actuated to grip the wicks. In the wick gripping position of its plates the carrier is of course disengaged from the flanges 39, but it does not drop since it is suspended from the wicks of the candles which it is gripping, and the candles are in turn supported by the holding plate 25, as best illustrated in FIGURES 6 and 10. When the finished candle rack is swung to its unloading position (FIGURE 3) the carrier will drop onto the holding plate and the holding plate 25 can be slid back to its inoperative position to permit the carrier to be flatwise bodily lifted, as shown in FIGURE 4, to withdraw all of the finished candles in the grip of the carrier from the racks at one time.

With the candles thus pendently supported from the carrier by their wicks, they can be transported to the dipping bath and dipped, as a group, without further handling. It will be apparent that after the dipped candles have dried, the carrier can be supported on any suitable fixture (not shown) by which the plates may be actuated to their open positions to release the candles, and if desired the colored candles can be dropped from the carrier directly into suitable bags or other packages.

It will also be apparent that while the candles illustrated in the drawings have smooth straight sides, the machine may be used to mold the so-called "baroque" candles which are helically fluted. In fact, it is these candles which are more often color dipped. Obviously, during the ejection of helically fluted candles from their molds, the candles rotate about their axes.

It should also be understood that the molded candles

From the foregoing description taken together with the accompanying drawings it will be apparent that this invention provides a carrier for finished molded candles, adapted to be used with a conventional candle molding machine, whereby an entire batch of candles or a substantial fraction thereof, can be removed simultaneously from the finished candle rack of the machine and can be readily dipped as a group, with the candles suspended from the carrier by their wicks, so that the carrier of this invention obviates the necessity for individual handling of single molded candles at any stage of their manufacture.

What is claimed as our invention is:

1. The combination with a candle molding machine of the type having upright tubular molds in which candles can be cast from molten candle body material, means beneath the molds for holding wick material that extends upwardly through the molds, and a finished candle rack bodily swingable on the machine between a candle receiving position spaced over the molds, in which the rack is adapted to receive partially hardened candles propelled axially upwardly from the molds and to support said candles in such a manner that wick material attached to them extends coaxially downwardly through the molds while new candles are being cast, and an unloading position in which the rack is disposed to one side of all of the molds with its bottom accessible to permit upward withdrawal of candles therefrom, of means for simultaneously removing a plurality of the candles from the rack when the rack is swung to its unloading position and for holding such candles suspended by their wicks to facilitate dipping them as a group, said means comprising: a pair of substantially flat plates, each having a plurality of holes, the axes of which are spaced apart by distances corresponding to the spacing of the axes of the molds in the machine, and which holes are larger in diameter than the molds to permit candles to pass axially therethrough; means holding said plates in flatwise superimposed relationship but edgewise shiftable relative to one another between an inoperative position in which the holes in the two plates are in register to permit candles to pass through the plates from the molds to the rack, and an operative position in which the holes in the plates are substantially out of register but opposing edge portions of holes in the two plates can cooperate in gripping the wicks of the candles that have been passed through the aligned holes in the plates, means on the rack for detachably supporting said plates beneath the rack with the holes in the plates centered with the molds so that candles can pass unimpeded through said plates from the molds to the rack; and means for shifting the plates to their operative wick gripping positions so that all of the candles in the rack may be removed therefrom at one time by lifting the plates off the rack after the rack has been swung to its unloading position.

2. The carrier of claim 1, further characterized by the fact that said means holding the plates in superimposed relation provides for substantial sliding friction between them so that the plates tend to resist edgewise shifting out of any relative positions in which they are placed.

3. In a candle molding machine having a plurality of upright molds into which molten candle body material may be poured to be formed therein, means to eject the formed candles from the molds, and a rack to receive the candles as they are ejected from the molds, the rack being movable from a candle receiving position over the molds to a candle unloading position adjacent to the molds, the improvement which comprises: a multiple candle carrier having cooperating elements relatively shiftable from an open position allowing candles to be moved axially through the carrier to a closed position gripping the wicks of the candles; and means on the rack of the machine to hold the carrier in position beneath the rack when the rack is in its candle receiving position, to have newly molded candles passed endwise through the carrier as they pass from the molds into the rack to bring the wicks of said candles into position to be gripped by the carrier upon closure thereof, said means providing for ready removal of the carrier from the rack when the rack is in its unloading position whereby a plurality of the candles molded in the machine and having their wicks gripped by the carrier may be simultaneously removed from the machine and suspended for subsequent simultaneous dipping.

4. In a candle molding machine of type having upright tubular molds in which candles can be cast from molten body material, and a rack normally above the molds for receiving candles axially propelled from the molds and for so retaining said candles, with wick material extending downwardly from them to bobbins or the like beneath the molds, as to dispose the wick material coaxially in the molds while new candles are being cast, said rack being bodily movable from its normal candle receiving position to a candle unloading position adjacent to the molds with its bottom accessible to permit the candles to be withdrawn therefrom: a multiple candle carrier comprising a plurality of flatwise superimposed plates which are edgewise shiftable relative to one another from an open position in which holes in the plates that are large enough to permit axial passage of candles therethrough are in register with one another, to a closed wick gripping position in which said holes are substantially out of register but opposing edge portions thereof are adapted to cooperate in gripping wick material extending therethrough; means on the machine for readily detachably supporting the carrier beneath the rack when the latter is in its normal candle receiving position, and for centering the registering holes in the flatwise superimposed plates of the carrier with the molds so that candles can pass unimpeded through the carrier from the molds to the rack, said means providing for bodily movement of the carrier with the rack as the rack is moved to its unloading position and for lifting of the carrier off the rack when the latter is in its unloading position; and means for shifting the superimposed plates of the carrier into their closed wick gripping positions so that all of the candles in the rack may be removed therefrom at one time by lifting the carrier off the rack after the rack has been moved to its unloading position.

References Cited in the file of this patent

UNITED STATES PATENTS

| 284,785 | Werk | Sept. 11, 1883 |
| 319,156 | Werk | June 2, 1885 |
| 767,872 | Davies | Aug. 16, 1904 |

FOREIGN PATENTS

| 27,202 | Australia | June 12, 1930 |
| 125,746 | Great Britain | Aug. 23, 1919 |
| 669,176 | Great Britain | Mar. 26, 1952 |